March 12, 1968  CHIN JUNG CHENG  3,372,463
FRICTION WELDING ZIRCONIUM ALLOYS TO NICKEL ALLOYS
Filed July 10, 1963
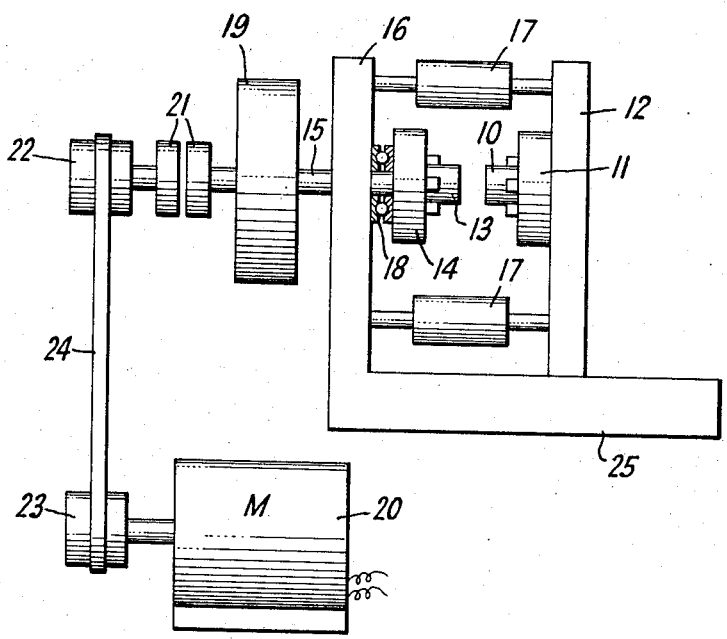
INVENTOR
CHIN JUNG CHENG 3,372,463
FRICTION WELDING ZIRCONIUM ALLOYS
TO NICKEL ALLOYS
Chin Jung Cheng, Norwalk, Conn., assignor to American Machine & Foundry Company, a corporation of New Jersey
Filed July 10, 1963, Ser. No. 293,935
3 Claims. (Cl. 29—470.3)

This invention relates in general to friction welding, and, more particularly, to the friction welding of zirconium and zirconium alloys to nickel alloys.

It has been found that pure zirconium and zirconium alloy, particularly the alloy sold under the trademark Zircaloy 2, an alloy difficult to weld by ordinary welding techniques, may be successfully and efficiently friction welded to a nickel alloy, preferably that sold under the trademark Inconel.

Zircaloy 2 alloy contains approximtaely 98% zirconium, 1.5% tin, 0.15% iron, 0.10% chromium, 0.05% nickel and traces of the following elements in parts per million, hafnium 150 p.p.m., aluminum 75 p.p.m., boron 0.5 p.p.m., carbon 400 p.p.m., cobalt 20 p.p.m., lead 50 p.p.m., magnesium 20 p.p.m., manganese 50 p.p.m., molybdenum 50 p.p.m., nitrogen 80 p.p.m., silicon 100 p.p.m., titanium 50 p.p.m., tungsten 50 p.p.m., and vanadium 50 p.p.m.

Commercial zirconium metal combines resistance to high concentrations of acid with equal resistance to strong alkalies. Zircaloy 2 was specifically developed for nuclear applications involving corrosion resistance to high pressure, high temperature water and has the required strength at moderately high operating temperatures.

Inconel alloy contains approximately .04% carbon, .35% manganese, .20% silicon, 15% chromium, 78% nickel, 1% columbium, 2.5% titanium, .9% aluminum and 7% iron. The alloy has high tarnish resistance and is used extensively at high temperatures. In consequence of the foregoing, elements made of zirconium or zirconium alloy welded to a nickel alloy find many applications in rockets and nuclear reactors.

A main object of this invention is to friction weld zirconium and zirconium alloy elements to nickel alloy elements. This and other objects, advantages and features of invention will become apparent from the following description and accompanying drawing wherein:

FIGURE 1 is a schematic drawing of an inertia friction welding apparatus.

Referring to the drawing in detail, there is shown a flywheel or inertia friction welding apparatus in which an Inconel workpiece 10 is held in a stationary chuck 11 fixed to the horizontally slideable vertical frame member 12 on base 25. A zirconium or Zircaloy 2 workpiece 13 is placed in the rotatably mounted chuck 14 which is fixed to shaft 15 which passes through the stationary vertical frame member 16. Of course, the workpieces may be interchanged. Hydraulic cylinders 17 are connected between the members 12 and 16 to draw them toward each other. A thrust bearing 18 takes the axial load from the rotating chuck 14. A flywheel 19 is fixed on shaft 15. Shaft 15 is driven by motor 20 through clutch 21 by means of the pulleys 22 and 23 and the belt 24.

To friction weld Inconel and zirconium or Zircaloy 2 workpieces 10 and 13, about 5,000 foot pounds of energy is delivered to the weld area for each square inch of weld area for butt welding. For stud to plate welding, two to three times such energy may be required. This energy should be delivered in less than ten seconds, preferably in two seconds or less, to prevent excessive upset in the lower melting Zircaloy 2. Since an inertia friction welding apparatus completes a weld much faster and yields equal or better quality than conventional friction welding apparatus, the weld of this invention is most easily made using inertia friction welding apparatus.

For best results in making the weld of this invention, the average relative surface speed between the workpieces should be at least two feet per second when using an inertia welding apparatus so that the weld can be completed in a short enough period of time and so that chatter and galling will not take place between the workpieces.

To make the weld, the workpieces should be forced together with a pressure of from 10,000 pounds per square inch to 80,000 pounds per square inch in the weld area.

In operation, the workpiece coupled to the flywheel is brought to the desired speed which stores sufficient energy in the flywheel to be delivered as welding heat when the stationary workpiece is forced against the rotating workpiece.

Welds can be made with the energy put into the weld varying from 2,000 to 25,000 foot pounds of energy per square inch of weld area, but the greater amount of energy may result in too much upset for a given application.

The forementioned limits substantially hold true for friction welds from $\frac{1}{100}$ square inch in weld area to over 10 square inches in weld area.

While this invention has been shown and described in the best forms known, it will nevertheless be understood that these are purely exemplary and that modifications may be made without departing from the spirit of the invention except as it may be more limited in the appended claims.

What is claimed is:

1. The method of friction welding zirconium and Zircaloy 2 workpieces to Inconel workpieces comprising the steps of rotating the workpieces relative to each other, and forcing the rotating workpieces with a force of over 10,000 pounds per square inch of weld area together so that more than 2,000 foot pounds of energy are released in the weld area for each square inch of weld area and so that the weld is completed within ten seconds.

2. The method according to claim 1 including imparting rotation to one of the workpieces and a flywheel coupled thereto to store energy, and forcing the workpieces together with a pressure from 10,000 to 80,000 pounds per square inch of weld area to stop the relative rotation of the workpieces entirely and complete the weld within ten seconds as the flywheel delivers over 2,000 foot pounds of energy per square inch of weld area to the weld area.

3. The method of friction welding zirconium and zirconium alloy to nickel alloy, comprising imparting rotation to a one workpiece and a coupled flywheel so that the flywheel mass stores the requisite amount of welding energy of between about 2,000 and 25,000 foot pounds to be released in the weld area for each square inch of weld area, forcing the workpieces together with a pressure of between about 10,000 and 80,000 pounds per square inch of weld area whereby to stop relative rotation and forge the workpieces together under the frictional welding heat to complete the weld in less than ten seconds.

References Cited

UNITED STATES PATENTS

| | | | |
|---|---|---|---|
| 2,850,798 | 9/1958 | Bowman et al. | 29—498 X |
| 2,946,119 | 7/1960 | Jones et al. | 29—497.5 X |
| 3,070,880 | 1/1963 | Davis et al. | 29—497.5 X |
| 3,134,169 | 5/1964 | Hollander et al. | 29—470.3 |
| 3,134,278 | 5/1964 | Hollander et al. | 29—470.3 |
| 3,175,284 | 3/1965 | Cotovsky | 29—470.3 |

JOHN F. CAMPBELL, *Primary Examiner.*